Oct. 16, 1934.  A. AGRONOFSKY  1,977,107
METHOD AND MEANS FOR CLEANING WASHING FLUIDS
AND RECOVERING VOLATILE SOLVENTS
Filed Dec. 12, 1931
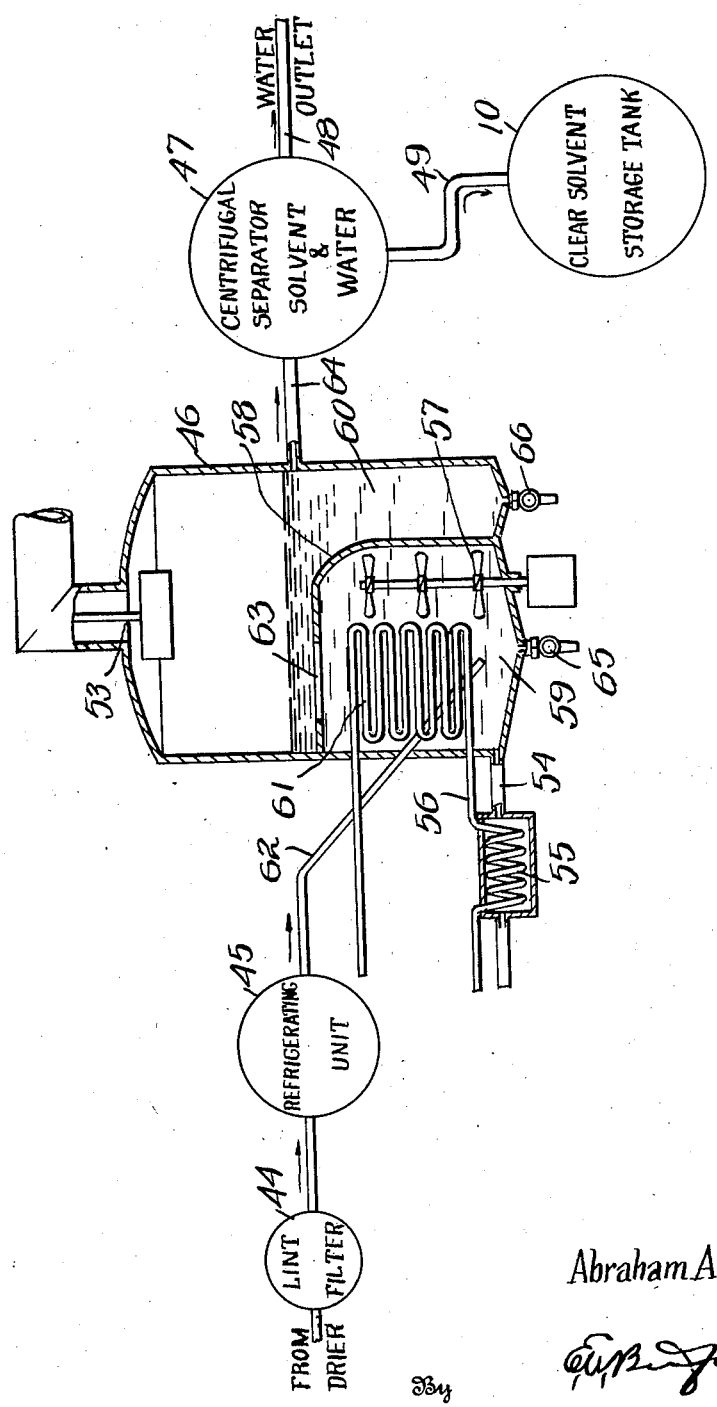
Inventor
Abraham Agronofsky
By
Attorney Patented Oct. 16, 1934

1,977,107

UNITED STATES PATENT OFFICE 1,977,107

METHOD AND MEANS FOR CLEANING WASHING FLUIDS AND RECOVERING VOLATILE SOLVENTS

Abraham Agronofsky, St. Joseph, Mo.

Application December 12, 1931, Serial No. 580,720

12 Claims. (Cl. 183—32)

My invention relates to a solvent recovery method and apparatus, and more particularly to a method and apparatus for recovering volatile cleaning solvent from air that has been used to dry garments or other articles cleaned with said cleaning fluid.

As heretofore practiced a large part of the volatile solvent taken out of the articles cleaned, with the aid of said solvent, by the drying air has been lost due to being discharged into the atmosphere. It is a purpose of my invention to provide a new and improved method and means for recovering such volatile solvent from the air, that has been used for drying the clothing or other articles, for further use for cleaning or similar purposes, in such a manner that all or substantially all said solvent is recovered from said drying air, and to so treat said solvent that the same is restored to its original condition, free of water or other material that may have become mixed with the same during the cleaning, drying or recovery processes.

Referring to the accompanying drawing which is made a part hereof and on which similar reference characters indicate similar parts, The figure is a diagrammatic view of the cleaning and solvent recovering system.

At the beginning of a cleaning operation the clean solvent storage tank will be filled or partially filled with a suitable cleaning compound. Many well known compounds are now on the market and any of several of these may be used with my system. Some of the better known and valuable cleaning compounds are gasoline, naphtha and carbon tetra-chloride. Other non-explosive volatile compounds may also be used. The invention therefore is not limited to the use of any particular cleaning fluid.

Air laden with volatile cleaning fluid is delivered from the drying apparatus by a suitable fan or pump mechanism through a lint filter or unit 44 where some of the foreign particles are removed from the air. The air is then passed through a refrigerating unit 45 to reduce its temperature to a very low degree. It is then delivered into the lower portion of a water cooling tank 46 where the gas preferably passes up through the body of water in the tank. In this process the solvent in the air is liquefied and the air is permitted to pass out through a vent 53 in the top of the tank. The solvent, due to the fact that its specific gravity is less than that of water, will ride on the surface of the water. Cold water is continuously supplied to the tank through a water inlet pipe 54. This water is cooled by a cold coil 55 before entering the tank. A cold brine coil or other cooling means 61 further cools the water in the tank 46. The velocity of the air and water entering the water serve to agitate the water. It may be desirable to provide further agitating means, such as propellers 57. The solvent is drawn off from the surface of the water and delivered into a centrifugal separator 47 where any water which may be carried over with the solvent is separated and delivered through a water outlet 48. The liquid solvent passes from the centrifugal separator through a pipe 49 into the clean solvent storage tank 10 where it is ready to be used again in a cleaning machine.

The tank 46 is provided with a wall 58 separating the tank into two compartments, an inlet chamber or compartment 59 and an outlet or discharge chamber or compartment 60. The agitating means 57 is located in the inlet compartment and the cooling means 56 preferably comprises a cooling coil 61 in said compartment located below the normal water level in said compartment. The conduit or pipe 62 leading from the refrigerating unit 45 extends into the inlet chamber with its discharge end located near the bottom thereof. The wall 58 is shown as having a vertical portion and a horizontal portion forming the top wall of the chamber or compartment 59 and as having an opening 63 therein leading into the compartment or chamber 60, which has a portion overlying the compartment 59 and extending to the top of the tank, and a portion located beside the compartment 59.

It will be obvious that due to the arrangement of the cooling and agitating means and said wall 58 that the air, which has been pre-cooled by passing through the refrigerating unit will be thoroughly mixed with the very cold water in the inlet compartment 59 so that all the volatile solvent in the air will be liquefied before the air has passed upwardly through the entire body of water, and that it will be tending to accumulate on top of the water due to the difference in specific gravity between the water and the solvent. Also due to the provision of the wall 58 the liquid in the compartment 60 will be substantially calm except above the wall 58 where the same will be agitated to some extent by the air bubbling therethrough, and that any water in the solvent will tend to separate out, the water accumulating in the lower portion of the compartment 60 and the solvent being decanted off by passing out through the overflow or outlet pipe 64, which is located a substantial distance above the top of compartment 59 and above the normal water level therein. Valved drain outlets 65 and 66 are preferably provided for the compartments 59 and 60.

It will be obvious to those skilled in the art that various changes may be made in my apparatus without departing from the spirit of the invention and therefore I do not limit myself to what is shown in the drawing and described in the specification, but only as indicated by the appended claims.

Having thus fully described my said invention what I claim as new and desire to secure by Letters Patent, is:

1. The method of reclaiming a volatile cleaning solvent from air used to dry clothing or other articles which have been cleaned with said solvent, comprising filtering solid particles from said air, cooling said air containing said solvent, passing said cooled air containing said solvent through and in intimate contact with a body of water cooled to a temperature to liquefy said solvent, decanting said solvent from said body of water and centrifugally extracting any water not removed by decantation from said decanted solvent.

2. The method of reclaiming a volatile cleaning solvent from air used to dry clothing or other articles which have been cleaned with said solvent, comprising cooling said air containing said solvent, passing said cooled air containing said solvent through a body of water cooled to a temperature to liquefy said solvent, decanting said solvent from said body of water and centrifugally extracting any water not removed by decantation from said decanted solvent.

3. Apparatus for reclaiming a volatile cleaning solvent from heated air, comprising a lint filter, a refrigerating unit receiving the heated air containing said cleaning solvent from said lint filter, a container for a body of cold water, means for passing the cooled air containing said cleaning solvent from said refrigerating unit into the lower portion of said body of cold water in said container to liquefy said solvent, means for draining liquid off the top of the body of liquid in said container and a centrifugal separator receiving said liquid drawn off the top of said body.

4. Apparatus for reclaiming a volatile cleaning solvent from heated air, comprising a refrigerating unit receiving the heated air containing said cleaning solvent, a container for a body of cold water, means for passing the cooled air containing said cleaning solvent from refrigerating unit into the lower portion of said body of cold water in said container to liquefy said solvent, means for drawing liquid off the top of the body of liquid in said container and a centrifugal separator receiving said liquid drawn off the top of said body.

5. Apparatus for reclaiming a volatile cleaning solvent from heated air, comprising a refrigerating unit receiving the heated air containing said cleaning solvent, a water chamber, means for supplying cold water to said chamber, a cooling coil in said chamber below the normal water level therein, means for passing the cooled air containing said cleaning solvent from said refrigerating unit into the cold water in said chamber to liquefy said solvent, means for drawing liquid only off the top of the body of liquid in said chamber and a centrifugal separator receiving said liquid drawn off the top of said body.

6. Apparatus for reclaiming a volatile cleaning solvent from heated air, comprising a lint filter, a refrigerating unit receiving the heated air containing said cleaning solvent from said lint filter, a container for a body of cold water, means for passing the cooled air containing said cleaning solvent from said refrigerating unit into the lower portion of said body of cold water in said container to liquefy said solvent, means dividing said container into a receiving and a discharge compartment, agitating and cooling means in said receiving compartment, means for drawing liquid off the top of the body of liquid in said discharge compartment, said compartments being in communication only at the upper portions thereof and a centrifugal separator receiving said liquid drawn off the top of said body.

7. Apparatus for reclaiming volatile cleaning solvent from heated air containing said solvent in a vapor state, comprising a refrigerating apparatus receiving said heated air, a solvent liquefier comprising a tank containing a body of liquid of much greater specific gravity than said solvent, means in said body of liquid for cooling the same to below the condensation point of said solvent, a conduit leading from said refrigerating apparatus into said tank near the bottom of said body of liquid, an air discharge connection in the upper portion of said tank, a liquid overflow connection leading from said tank, means directing liquid from the top of said body of liquid only to said over-flow connection, a centrifugal separator receiving liquid from said over-flow connection, a solvent discharge conduit and a discharge conduit for said liquid of greater specific gravity than said solvent leading from said centrifugal separator.

8. Apparatus for reclaiming volatile cleaning solvent from heated air containing said solvent in a vapor state, comprising a refrigerating apparatus receiving said heated air, a solvent liquefier comprising a tank containing a body of liquid of much greater specific gravity than said solvent, means for supplying pre-cooled liquid to said tank, a wall in said tank dividing the same into an inlet chamber and an outlet chamber, means in said body of liquid in said inlet chamber for cooling the same to below the condensation point of said solvent, a conduit leading from said refrigerating apparatus into said tank near the bottom of said inlet chamber, an air discharge connection in the upper portion of said tank, said inlet chamber and said outlet chamber being in communication at the top of said wall only, a liquid outlet in said outlet chamber above the top of said wall, a centrifugal separator and means connecting said liquid outlet with said separator, a solvent discharge conduit and a discharge conduit for said liquid of greater specific gravity than said solvent leading from said centrifugal separator.

9. Apparatus for reclaiming volatile cleaning solvent from heated air containing said solvent in a vapor state, comprising a refrigerating apparatus receiving said heated air, a solvent liquefier comprising a tank containing a body of liquid of much greater specific gravity than said solvent, a wall in said tank dividing the same into an inlet chamber and an outlet chamber, means in said body of liquid for cooling the same to below the condensation point of said solvent, a conduit leading from said refrigerating apparatus into said tank near the bottom of said inlet chamber, an air discharge connection in the upper portion of said tank, agitating means in said inlet chamber, said inlet chamber and said outlet chamber being in communication at the top of said wall, a liquid outlet in said outlet chamber above the top of said wall, a centrifugal separator and means connecting said liquid outlet with said separator, a solvent discharge conduit and a discharge conduit for said liquid of greater specific gravity than said solvent leading from said centrifugal separator.

10. Apparatus for reclaiming volatile cleaning solvent from heated air containing said solvent in a vapor state, comprising a refrigerating apparatus receiving said heated air, a solvent liquefier comprising a tank containing a body of water, means for continuously cooling said water and means for passing the air containing said solvent discharged from said refrigerating apparatus into said body of water adjacent the bottom thereof to liquefy said solvent and means for drawing liquid only off the top of said body.

11. The method of reclaiming a volatile cleaning solvent from air used to dry clothing or other articles which have been cleaned with said solvent, comprising, cooling said air containing said solvent, bubbling said cooled air containing said solvent through a body of water cooled to a temperature to liquefy said solvent while agitating said water, calming a portion of said body of water, and separating said solvent from said calmed portion of said body of water.

12. The method of reclaiming a volatile cleaning solvent from air used to dry clothing or other articles which have been cleaned with said solvent, comprising cooling air containing said solvent, passing said cooled air containing said solvent through and in intimate contact with a body of water cooled to a temperature to liquefy said solvent, and separating said solvent from said water.

ABRAHAM AGRONOFSKY.